(12) United States Patent
Chien et al.

(10) Patent No.: US 7,333,158 B2
(45) Date of Patent: Feb. 19, 2008

(54) THREE-DIMENSIONAL DISPLAY SYSTEM AND METHOD THEREOF

(75) Inventors: Ko-Wei Chien, Keelung (TW); Han-Ping Shieh, Hsinchu (TW); Yu-Mioun Chu, Alian Township, Kaohsiung County (TW); Ching-Yu Tsai, Hsinchu (TW); Yung-Lun Lin, Wujie Township, Yilan County (TW); Chih-Jen Hu, Hsinchu (TW); Chih-Ming Chang, Jhongli (TW); Yi-Cheng Hsu, Taipei (TW); Po-Lun Chen, Chiayi (TW)

(73) Assignee: AU Optronics Corp., Hsinchu (TW)

( * ) Notice: Subject to any disclaimer, the term of this patent is extended or adjusted under 35 U.S.C. 154(b) by 250 days.

(21) Appl. No.: 11/027,946

(22) Filed: Jan. 4, 2005

(65) Prior Publication Data

US 2005/0264717 A1    Dec. 1, 2005

(30) Foreign Application Priority Data

May 25, 2004   (TW) ................................ 93114833 A

(51) Int. Cl.
*G02F 1/1335* (2006.01)
(52) U.S. Cl. ............................. 349/15; 349/61; 349/65; 349/68
(58) Field of Classification Search .................. 349/15, 349/61, 62, 65, 68
See application file for complete search history.

(56) References Cited

U.S. PATENT DOCUMENTS

| 5,550,657 | A | * | 8/1996 | Tanaka et al. ................. 349/62 |
| 6,206,550 | B1 | * | 3/2001 | Fukushima et al. ......... 362/335 |
| 6,474,827 | B2 | * | 11/2002 | Shinohara et al. .......... 362/607 |
| 2003/0021917 | A1 | * | 1/2003 | Hotaka et al. ................ 428/29 |
| 2003/0063234 | A1 | * | 4/2003 | Oda et al. ..................... 349/65 |

\* cited by examiner

*Primary Examiner*—Andrew Schechter
*Assistant Examiner*—Nathanael Briggs
(74) *Attorney, Agent, or Firm*—Rabin & Berdo, PC

(57) ABSTRACT

A three-dimensional (3D) display system includes a liquid crystal display and a directional backlight module. The backlight module disposed behind the liquid crystal display includes a light-guide plate, a focusing layer, a left backlight source, a right backlight source, and a first V-shaped micro-grooved and a second V-shaped micro-grooved structures of the light-guide plate. The focusing layer is disposed between the light-guide plate and the liquid crystal display. The 3D display method is to instantly switch on and off the left and the right backlight sources to alternately emit the light from the left side and right side of light-guide plate. By means of the first and the second V-shaped micro-grooved structure, the light transmitted from the light-guide plate is focused by the focusing layer within a particular range of angles and passing through the liquid crystal layer for being alternately projected to form a 3D image.

24 Claims, 5 Drawing Sheets

THREE-DIMENSIONAL DISPLAY SYSTEM AND METHOD THEREOF

This application claims the benefit of Taiwan application Serial No. 93114833, filed May 25, 2004, the subject matter of which is incorporated herein by reference.

BACKGROUND OF THE INVENTION

1. Field of the Invention

The present invention relates to a display system and a method thereof. More particularly to a three-dimensional (3D) display system and method thereof.

2. Description of the Related Art

As the display technique of two-dimensional (2D) images getting matured, the display technique of 3D images will be a trend in next generation. The display of 3D image not only provides a better quality entertainment, but also has a wide range of application in all aspects of real life such as medical and military purposes. In real world, an image is interpreted as a 3D image via the binocular disparity of the brain. Artificial 3D image forming principle forms a 3D image by simulating the real situation or by projecting different image stereo pairs onto the left eye and the right eye to provide additional depth information.

Conventional 3D image forming technique can be categorized into three types: the full-image type, the multi-plane type and the stereo-pair type. Since full-image type and the multi-plane type are disadvantaged by the difficulty in processing large amount of data and a poor display quality, the research and development of 3D image displayer are focused on the stereo-pair type in recent years. The conventional stereo-pair type image forming technique uses spatial-multiplexed method, which divides a liquid crystal layer into a plurality of 3D image pairs for respectively projecting the image of the left eye and the right eye to the left eye and the right eye to form the 3D image.

SUMMARY OF THE INVENTION

It is therefore an object of the present invention to provide a 3D display system and the method thereof using time-multiplexed method to present a 3D image with higher resolution and brightness.

According to the present invention, a 3D display system including a liquid crystal display panel and a directional backlight module is provided. The directional backlight module is disposed behind the liquid crystal display panel. The liquid crystal display panel having a liquid crystal layer. The directional backlight module includes a light-guide plate, a focusing layer, a left backlight source and a right backlight source, a first V-shaped micro-grooved structure and a second V-shaped micro-grooved structure. The light-guide plate has a light-guiding surface facing the liquid crystal display panel. The focusing layer is disposed between the light-guide plate and the liquid crystal display panel. The focusing layer having a focusing surface, and the focusing surface is opposite to the light-guiding surface. The left backlight source and the right backlight source respectively disposed on the left side and right side of the light-guide plate. The left backlight source and the right backlight source being instantly switched on and off to alternately emit light from the left side and right side of the light-guide plate. The first V-shaped micro-grooved structure is disposed on the light-guiding surface, for directing the light emitted by the left backlight source and the right backlight source to be transmitted from the light-guiding surface in a large emergence angle. The second V-shaped micro-grooved structure is disposed on the focusing surface, for directing the light guided by the light-guide plate to be transmitted from the focusing layer within a particular range of angles. The light, after being focused by the focusing layer and passing through the liquid crystal layer, is alternately projected to form the 3D image.

According to the present invention, a 3D display method applied in a liquid crystal display (LCD) is provided. The LCD includes a liquid crystal layer, a light-guide plate (LGP), a focusing layer, a left backlight source and a right backlight source. The 3D display method includes, firstly, instantly switching on and off the left backlight source and the right backlight source to alternately emit light from the left side and right side of light-guide plate for providing a directional light. Next, directing the light to be transmitted from the light-guide plate in a large emergence angle via the first V-shaped micro-grooved structure light-guide plate, and directing the light guided by the light-guide plate to be transmitted from the focusing layer via the second V-shaped micro-grooved structure of the focusing layer within a particular range of angles. The first V-shaped micro-grooved structure is opposite to the second V-shaped micro-grooved structure. Lastly, the light, after being focused by the focusing layer and passing through the liquid crystal layer, is alternately projected onto the left eye and the right eye respectively to present a 3D image.

Other objects, features, and advantages of the invention will become apparent from the following detailed description of the preferred but non-limiting embodiments. The following description is made with reference to the accompanying drawings.

DETAILED DESCRIPTION OF THE INVENTION

The image forming technique adopted in the present invention is a stereo-pair type 3D image forming technique. The 3D display system and the method thereof according the present invention directly uses the structural characteristics of internal elements of a backlight module and the time-multiplexed method so that the light, after emitting from the backlight module and passing through a liquid crystal layer, can be projected onto the left eye and the right eye respectively to present a 3D image.

Figure 1:
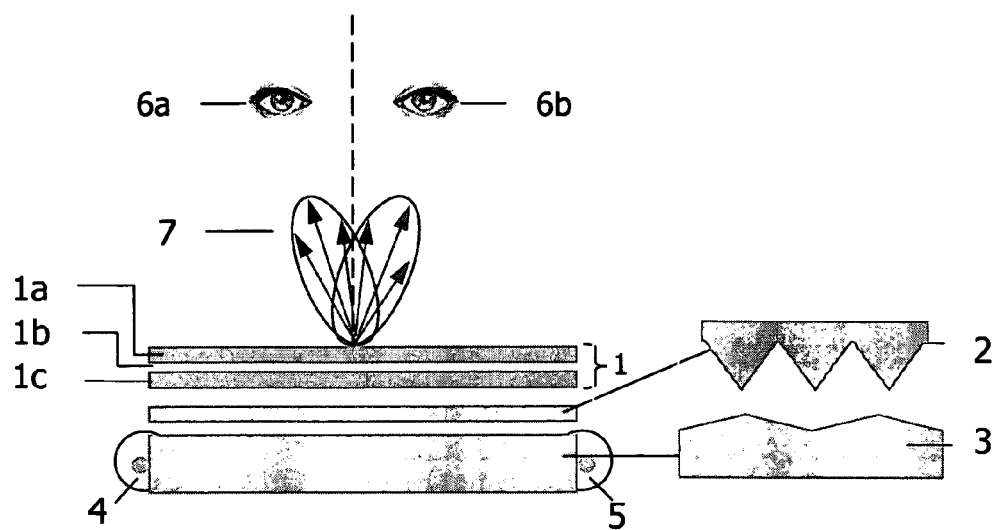
FIG. 1 is a structural diagram of a 3D display system according to a preferred embodiment of the invention.
Figure 3:
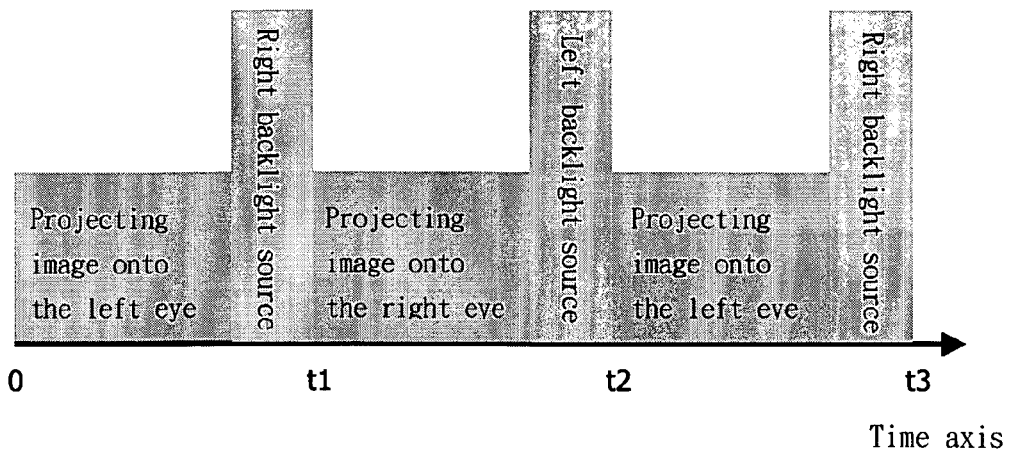
FIG. 3 is a diagram showing the relation between image projection and time.

Referring to FIG. 1, a structural diagram of a 3D display system according to a preferred embodiment of the present invention is shown. The 3D display system according to the present invention includes a liquid crystal display panel 1 and a directional backlight module. As shown in FIG. 1, the liquid crystal display panel 1 includes an first substrate 1a, a liquid crystal layer 1b and a second substrate 1c, wherein the liquid crystal layer 1b is sandwiched between the first substrate 1a and second substrate 1c. The directional backlight module, which is disposed behind the liquid crystal display panel 1, mainly includes a light-guide plate 3, a focusing layer 2, a left backlight source 4 and a right backlight source 5. The focusing layer 2 is disposed between the light-guide plate 3 and the liquid crystal display panel 1. The light-guiding surface of the light-guide plate 3, which faces the liquid crystal display panel 1, is opposite to the focusing surface of the focusing layer 2. The left backlight source 4 and the right backlight source 5 are respectively disposed on the left side and right side of light-guide plate 3. The present invention uses time-multiplexed method to enable the light, after being transmitted from the focusing layer 2 and passing through the liquid crystal layer 1b, to be alternately projected onto the left eye 6a and the right eye 6b, a 3D image can be formed by the left eye and the right eye 6a and 6b. Under the instant switch of images, an image is interpreted as a 3D image via the binocular disparity of the brain, wherein the relation between image and time is shown in FIG. 3. When the right backlight source 5 radiates at time one t1, one image of stereo-paired images is projected onto the viewer's right eye 6a. When the left backlight source 4 radiates at time two t2, another image of stereo-paired images is projected onto the viewer's right eye 6b. In FIG. 1, when the light provided by the left backlight source 4 and the light provided by the right backlight source 5 transmit from the light-guide plate 3 respectively, two viewable angles, whose included angle forms a 3D image viewable angle 7, are formed thereon.

Figure 2:
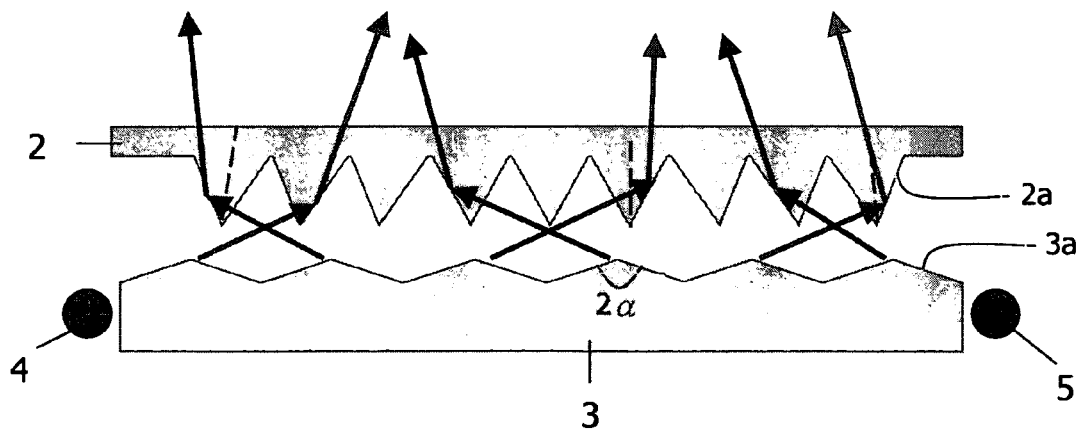
FIG. 2 is an enlarged side view of the backlight module in the FIG. 1 and a schematic diagram of the light path thereof.

FIG. 2, an enlarged side view of the backlight module in FIG. 1 and a schematic diagram of the light path thereof is shown. The 3D display method of the present invention is to instantly switch on and off the left backlight source 4 and the right backlight source 5 to alternately emit light from the left side and right side of light-guide plate 3 for providing a directional light. As shown in FIG. 2, the light-guiding surface of the light-guide plate 3 is equipped with a first V-shaped micro-grooved structure 3a to form a plurality of light-guiding regions with symmetric V-shaped structures, the point angles on the light-guiding regions are substantially identical, and the apex symmetric axis of the light-guiding region is vertically disposed. Besides, the first V-shaped micro-grooved structure can be of two-dimensional distribution so that the light guided by the light-guide plate 3 can be more evenly distributed. For exemplify, the point angle $2\alpha$ on light-guiding of region of the first V-shaped micro-grooved structure 3a ranges 100°~179°, the light emitted from the left backlight source 4 and the right backlight source 5, via the function of the first V-shaped micro-grooved structure 3a, can be transmitted from the light-guiding surface at an substantially identical large angle to achieve beam-splitting. Next, in order to deflect the light at different angles, the focusing surface of the focusing layer 2 is equipped with a second V-shaped micro-grooved structure 2a, so that the light guided by the light-guide plate 3, after being projected onto different focusing regions, can be transmitted from the focusing layer 2 at various angle of deflection within a particular range of angles. Besides, the viewer, according to the position of viewing the image, can adjust the relative position between the light-guide plate 3 and the focusing layer 2 to have a 3D image of utmost clarity.

In FIG. 2, the second V-shaped micro-grooved structure 2a, which is a non-symmetric V-shaped structure, forms a plurality of focusing regions with non-symmetric V-shaped structure on the focusing surface. The point angles on the focusing region are substantially identical, but the symmetric axes thereof are slightly skewed with different degrees of tilting. The advantage of the design of a non-symmetric V-shaped structure lies in having a precise control of the deflecting angles of the light transmitted from various regions, so that the variation of the emergence angle of the light will not enlarge with the increase in panel size. Besides, the second V-shaped grooved structure, which can be a symmetric V-shaped structure as well, forms a plurality of focusing regions with symmetric V-shaped structure on the focusing surface. The point angles on the focusing region are substantially identical, and the symmetric axes thereof are vertically disposed on the focusing region. The design of symmetric V-shaped structure has the advantage of a simple manufacturing process. Moreover, for ordinary small-sized panels, the variation on the emergence angle of the light has little influence on the viewer, so the design of a symmetric V-shaped structure fits ordinary small-sized panels well. But, for the big-sized panels still to suitable for the present invention.

Figure 4:
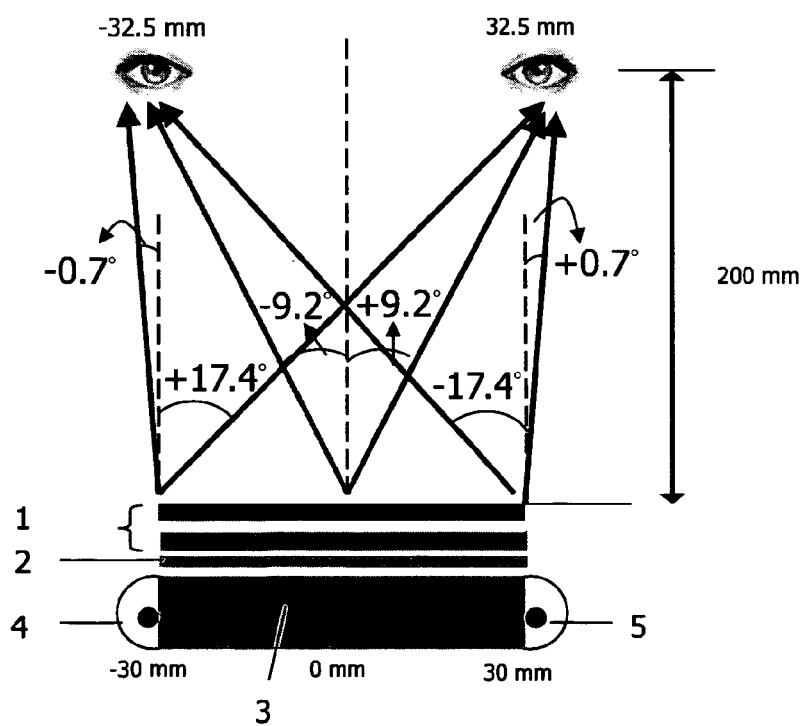
FIG. 4 a schematic diagram showing the relative position between the viewer and the 3D display system, and the distribution of the emergence angles of the light.
Figure 5:
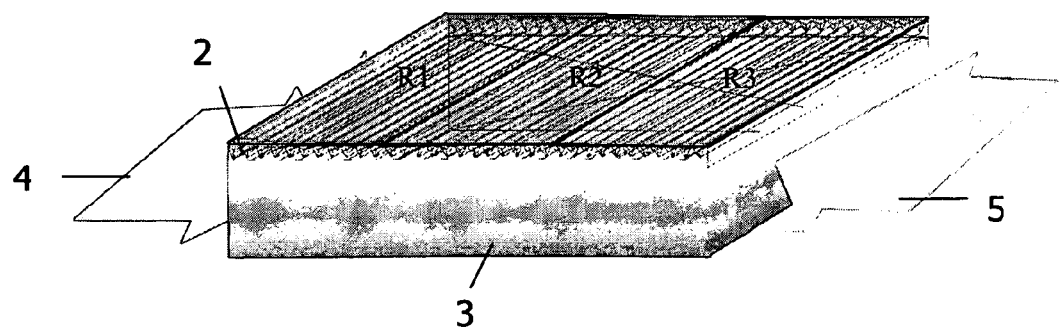
FIG. 5 is a structural diagram of using an optical software to simulate a directional backlight module.

According to the essence of the present invention, the image forming principle of the 3D display system of the invention is exemplified by a personal digital assistant (PDA) sized display system, using an optical simulation and analysis software to build a model with directional backlight source, and using a plurality of detectors to detect the light intensity and angle distribution of various regions to compare the results of analysis and testing. FIG. 4 is a schematic diagram showing the relative position between the viewer and the 3D display system, and the distribution of the emergence angles of the light. The viewer's two eyes are 65 mm apart, the distance of observation is approximately 200 mm, and the width between the left side and the right side of the light-guide plate 3. That is, the left backlight source 4 and the right backlight source 5, is approximately 60 mm. In other words, the width of light-guide plate 3 is substantially 60 mm. FIG. 5 is a structural diagram of using optical software to simulate a directional backlight module. Referring to FIG. 4 and FIG. 5 together. Ideally, when the left backlight source 4 radiates, the light on the first region, the second region and the third region of the focusing layer will pass the liquid crystal layer 1b at the angle of +17.4°, +9.2° and +0.7° respectively; whereas when the right backlight source 5 radiates, the light on the first region, the second region and the third region of the focusing layer will pass the liquid crystal layer 1b at the angle of −17.4°, −9.2°, −0.7° respectively. With the instant switch between the left right backlight source 4 and the right backlight source 5 and the instant switch to the liquid crystal layer 1b, the view will sense a 3D image.

Figure 6:
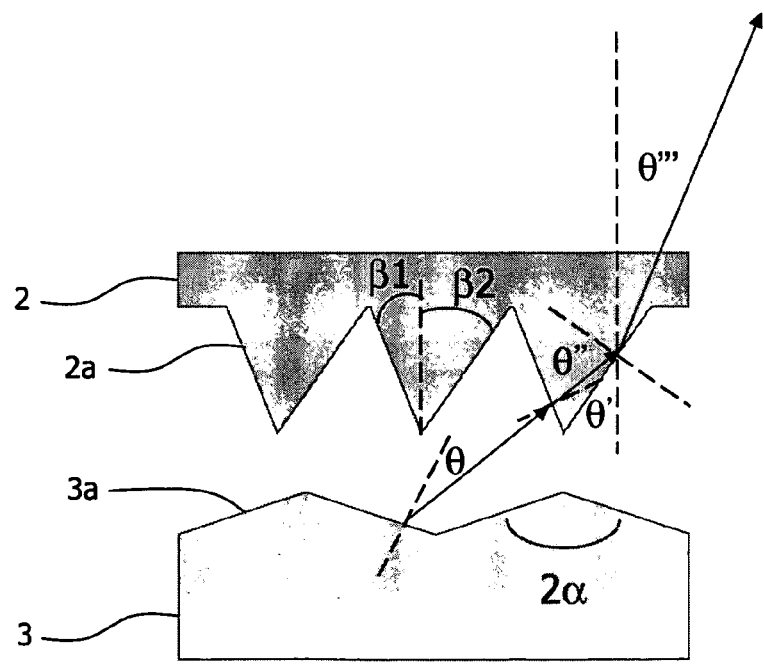
FIG. 6 is a diagram showing the relation between the change in light path and the angle.

Referring to FIG. 6, a diagram showing the relation between the change in light path and the angle is shown. The included angle between the two viewable angles of the light transmitted from the light-guide plate 3 increases along with the increase in the point angle $2\alpha$ of the first V-shaped micro-grooved structure 3a on the light-guiding region. When both light sources radiate, if the point angle $2\alpha$ changes from 140° to 170°, the distribution of viewable angle will shift from ±60° to ±70°. To further have the light transmitted from various regions of the light-guide plate 3 onto the position of the left eye and the right eye, the second V-shaped micro-grooved structure 2a of the focusing layer 2 needs to be particularly designed so that the point angle on each focusing region of the second V-shaped micro-grooved structure 2a remains constant, but the symmetric axis thereof is slightly skewed with different degrees of tilting. As shown in FIG. 6, the point angle on the focusing region includes β1 and β2, with the sum being a constant. If β1=β2, the point angle is symmetric; if β1≠β2, the point angle is non-symmetric with the symmetric axis thereof slightly tilts. The light, after guided by the light-guide plate 3, projects onto, deflects and reflects on, and finally is transmitted from the focusing layer 2, wherein the relation between changes in light path and angles is expressed below:

$$n \times \sin\theta' = \sin(\theta - (\alpha - \beta 1))$$

$$\theta'' = 180° - \theta' - (180° - (\beta 1 + \beta 2))$$
$$= \beta 1 + \beta 2 - \theta'$$

$$\beta 2 - \theta''' = 90° - \theta''$$

$$\theta''' = 2 \times \beta 2 + \beta 1 - 90° - \theta'$$

Figure 7:
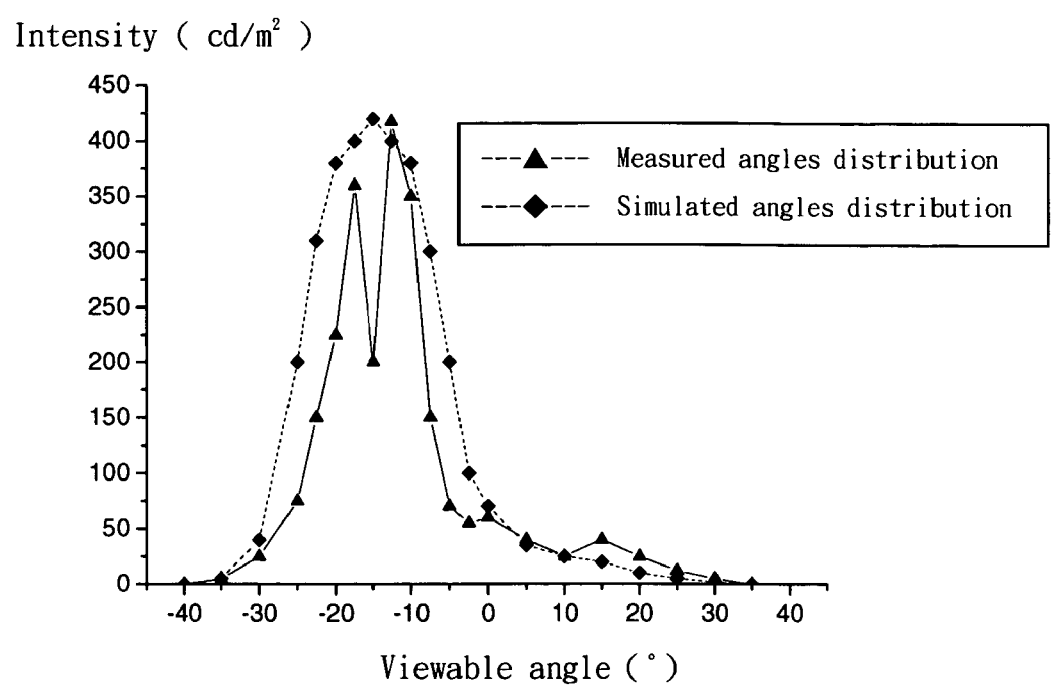
FIG. 7 is a distribution of angles of light after being focused by the second region of the focusing layer.
Figure 8:
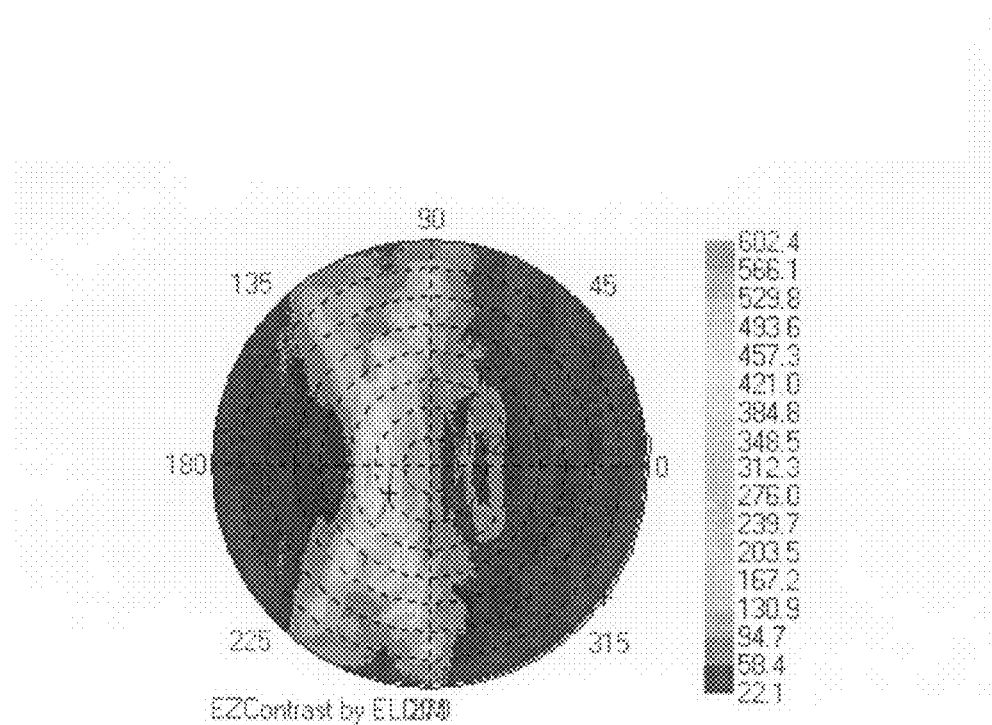
FIG. 8 is a distribution diagram of measured angles of a 3D display system when the right backlight source radiates.
Figure 9:
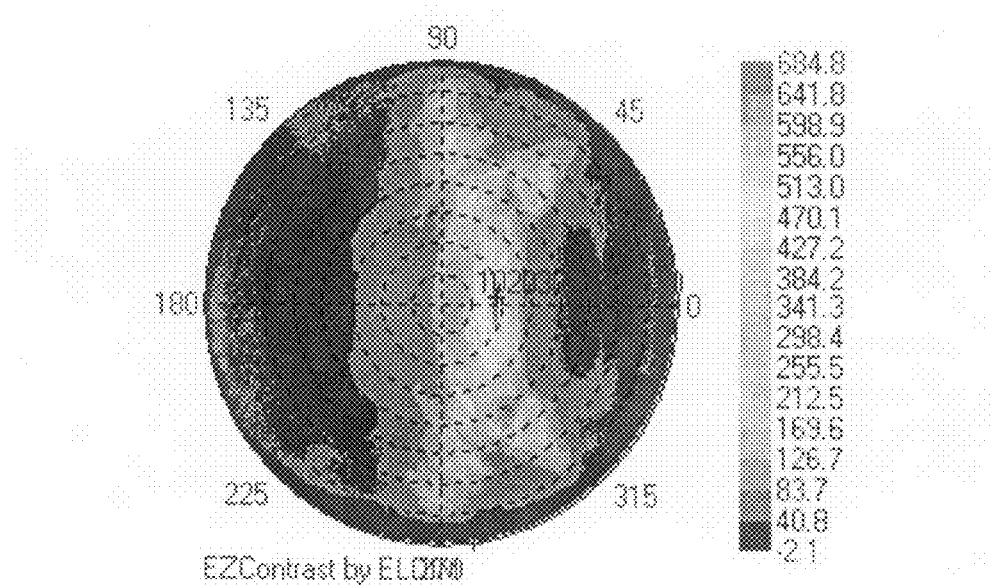
FIG. 9 is a distribution diagram of measured angles of a 3D display system when the left backlight source radiates.

In the preferred embodiment of invention is exemplified by the PDA sized display system, the point angle 2α is 168° and the groove interval is 300 μm, while the point angle (β1, β2) on the first region, the second region and the third region of the focusing region in FIG. 5 respectively corresponds to (25°, 35°), (30°, 30°) and (35°, 25°). When the right backlight source 5 radiates, theoretically, the emergence angle of the light on the second region is −9.2°. Referring to FIG. 7, a diagram showing the relation between the intensity of and the viewable angle of the light transmitted from the focusing region of the second region according to actual simulation results of a detector is shown. The distribution of angles according to actual measuring is substantially close to that of simulated results. Referring to the appendixes. FIG. 8 is a distribution diagram of measured angles of a 3D display system when the right backlight source radiates, while FIG. 9 is a distribution diagram of measured angles of a 3D display system when the left backlight source radiates.

In the preferred embodiment of the invention disclosed above, the 3D display system and the method thereof uses time-multiplexed approach to instantly switch the left backlight source and the right backlight source for alternately emitting light from the left side and right side of the light-guide plate without using shielding method for beam-splitting, effectively improving the luminance of the light source so as to provide a 3D image with higher resolution and brightness. Compared with the conventional stereo-pair type technique which uses spatial-multiplexed approach, the present invention directly uses the structural characteristics of internal components of a backlight module and the time-multiplexed method so that the light, after emitting from the backlight module and passing through a liquid crystal layer 1b, can be projected onto the left eye and the right eye respectively to present a 3D image. Besides, when the left backlight source and the right backlight source radiate simultaneously, the invention can also be used as a 2D display system.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A three-dimensional (3D) display system, comprising:
   a liquid crystal display panel having a liquid crystal layer; and
   a directional backlight module, disposed behind the liquid crystal display panel, comprising:
   a light-guide plate having a light-guiding surface opposite to the liquid crystal display panel;
   a focusing layer, disposed between the light-guide plate and the liquid crystal display panel, having a focusing surface opposite to the light-guiding surface;
   a left backlight source and a right backlight source respectively disposed on two sides of the light-guide plate, the left/right backlight source being instantly switched to alternately emit light from the two sides of the light-guide plate;
   a first V-shaped micro-grooved structure, disposed on the light-guiding, surface, for directing the light emitted from the left/right backlight source to be transmitted from the light-guiding surface at a substantially large angle; and
   a second V-shaped micro-grooved structure, disposed on the focusing surface, for directing the light guided by the light-guide plate to be transmitted from the focusing layer within a particular range of angles;
   whereby the light focused by the focusing layer passes through the liquid crystal layer for being alternately projected to form a 3D image.

2. The 3D display system according to claim 1, wherein the second V-shaped micro-grooved structure is divided into a plurality of focusing regions, the point angles of the second V-shaped micro-grooved structure on the focusing regions are substantially identical, the symmetric axes thereof have different degrees of tilting, and the light projected onto different regions is deflected at different angles.

3. The 3D display system according to claim 2, wherein the second V-shaped micro-grooved structure is a non-symmetric V-shaped structure.

4. The 3D display system according to claim 2, wherein the second V-shaped micro-grooved structure is a symmetric V-shaped structure.

5. The 3D display system according to claim 1, wherein the first V-shaped micro-grooved structure is divided into a plurality of light-guiding regions, and the point angles on the light-guiding regions are substantially identical.

6. The 3D display system according to claim 5, wherein the first V-shaped micro-grooved structure is symmetric.

7. The 3D display system according to claim 1, wherein the first V-shaped micro-grooved structure is a two-dimensional distribution.

8. A 3D display method applied in an liquid crystal display, the liquid crystal display including a liquid crystal layer, a light-guide plate, a focusing layer, a left backlight source and a right backlight source, the method comprising:
   instantly switching the left backlight source and the right backlight source to alternately emit light from two sides of the light-guide plate for providing a directional light;
   directing the light to be transmitted from the light-guide plate at a substantially large angle via a first V-shaped micro-grooved structure of the light-guide plate;

directing the light guided by the light-guide plate to be transmitted from the focusing layer within a particular range of angles via a second V-shaped micro-grooved structure of the focusing layer, and the first V-shaped micro-grooved structure is opposite to the second V-shaped micro-grooved structure; and passing the light focused by the focusing layer through a liquid crystal layer for being alternately projected to form the 3D image.

9. The 3D display method according to claim 8, wherein the method further comprising:

adjusting a relative position between the light-guide plate and the focusing layer according to the position at viewing the image.

10. The 3D display method according to claim 8, wherein the second V-shaped micro-grooved structure is divided into a plurality of regions, the point angles of the second V-shaped micro-grooved structure on the regions are substantially identical, the symmetric axes thereof have different degrees of tilting, and the light projected onto different regions is deflected at different angles.

11. The 3D display method according to claim 10, wherein the second V-shaped micro-grooved structure is a non-symmetric V-shaped structure.

12. The 3D display method according to claim 10, wherein the second V-shaped micro-grooved structure is a symmetric V-shaped structure.

13. The 3D display method according to claim 8, wherein the first V-shaped micro-grooved structure is divided into a plurality of light-guiding regions, and the point angles on the light-guiding regions are substantially identical.

14. The 3D display method according to claim 13, wherein the first V-shaped micro-grooved structure is a symmetric V-shaped structure.

15. The 3D display method according to claim 8, wherein the first V-shaped micro-grooved structure is a two-dimensional distribution.

16. A directional backlight module for use with a liquid crystal display for displaying a 3D image, comprising:

a light-guide plate having a light-guiding surface opposite to the liquid crystal display;

a focusing layer, disposed between the light-guide plate and the liquid crystal display, having a focusing surface opposite to the light-guiding surface;

a left backlight source and a right backlight source respectively disposed on two sides of the light-guide plate, the left backlight source and the right backlight source being instantly switched to alternately emit the light from the left side and right side of the light-guide plate;

a first V-shaped micro-grooved structure, disposed on the light-guiding surface, for directing the light emitted from the left backlight source and the right backlight source to be transmitted from the light-guiding surface at a substantially large angle; and a second V-shaped micro-grooved structure, disposed on the focusing surface, for directing the light guided by the light-guide plate to be transmitted from the focusing layer within a particular range of angles.

17. The directional backlight module according to claim 16, wherein the second V-shaped micro-grooved structure is divided into a plurality of regions, the point angles of the second V-shaped micro-grooved structure on the regions are substantially identical, the symmetric axes thereof have different degrees of tilting, and the light projected onto different regions is deflected at different angles.

18. The directional backlight module according to claim 17, wherein the second V-shaped micro-grooved structure is a non-symmetric V-shaped structure.

19. The directional backlight module according to claim 17, wherein the second V-shaped micro-grooved structure is a symmetric V-shaped structure.

20. The directional backlight module according to claim 16, wherein the first V-shaped micro-grooved structure is divided into a plurality of light-guiding regions, and the point angles on light-guiding regions are substantially identical.

21. The directional backlight module according to claim 20, wherein the first V-shaped micro-grooved structure is a symmetric V-shaped structure.

22. The directional backlight module according to claim 16, wherein the first V-shaped micro-grooved structure is a two-dimensional distribution.

23. The directional backlight module according to claim 16, wherein the light after being redirected by the focusing layer is alternately projected to form a 3D image.

24. The directional backlight module according to claim 16, wherein the left backlight source and the right backlight source simultaneously emit and project light to form a 2D image.

* * * * *